United States Patent
Thorwart et al.

(10) Patent No.: US 12,467,535 B1
(45) Date of Patent: Nov. 11, 2025

(54) DEVICE FOR A VEHICLE DRIVELINE WITH AN AXLE DIFFERENTIAL

(71) Applicant: ZF Friedrichshafen AG, Friedrichshafen (DE)

(72) Inventors: Alexander Thorwart, Langenargen (DE); Michael Preuß, Friedrichshafen (DE); Bernard Hunold, Friedrichshafen (DE); Niclas Raeder, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 19/054,003

(22) Filed: Feb. 14, 2025

(30) Foreign Application Priority Data

Feb. 22, 2024 (DE) .................... 10 2024 201 618.7

(51) Int. Cl.
  *F16H 63/48* (2006.01)
  *F16H 48/24* (2006.01)
  *F16H 48/34* (2012.01)
  *F16H 63/34* (2006.01)

(52) U.S. Cl.
  CPC .......... *F16H 63/486* (2013.01); *F16H 48/24* (2013.01); *F16H 48/34* (2013.01); *F16H 63/3466* (2013.01); *F16H 2048/343* (2013.01)

(58) Field of Classification Search
  CPC .... F16H 63/486; F16H 63/3466; F16H 48/24; F16H 48/34; F16H 2048/343
  See application file for complete search history.

(56) References Cited

U.S. PATENT DOCUMENTS

| | | | |
|---|---|---|---|
| 2016/0097443 A1* | 4/2016 | Larsson | F16H 63/3425 475/150 |
| 2017/0234428 A1 | 8/2017 | Spooner et al. | |
| 2020/0124168 A1* | 4/2020 | Ohlig | F16H 63/3466 |
| 2020/0171940 A1* | 6/2020 | Ohlig | B60T 13/746 |
| 2023/0167898 A1* | 6/2023 | Li | F16H 48/24 192/219.5 |

FOREIGN PATENT DOCUMENTS

| | | |
|---|---|---|
| DE | 10 2008 040 206 | 1/2010 |
| DE | 10 2011 002 709 | 7/2012 |
| DE | 10 2020 113 497 | 11/2021 |
| DE | 10 2022 214 125 | 6/2024 |

OTHER PUBLICATIONS

German Patent Office, German Search Report issued in German Patent application No. 10 2024 201 618.7 (Jan. 17, 2025).

* cited by examiner

*Primary Examiner* — Lori Wu
(74) *Attorney, Agent, or Firm* — Finch & Maloney PLLC

(57) ABSTRACT

A device for a vehicle drivetrain has an axle differential, a differential blocking device for blocking and releasing the equalization function of the axle differential, a parking lock for blocking and releasing the drive output of the vehicle drivetrain, and an actuation mechanism configured to be driven by a drive unit. By way of the actuation mechanism, the differential blocking device and the parking lock can be actuated by the drive unit. Actuating the parking lock and the differential blocking device are correlated with one another in such manner that at the end of a first phase of actuation, only the equalization function of the axle differential can be blocked and the parking lock is in its disengaged condition. At the end of a second phase of actuation, the equalization function of the axle differential can be blocked, and the parking lock can be engaged.

16 Claims, 9 Drawing Sheets

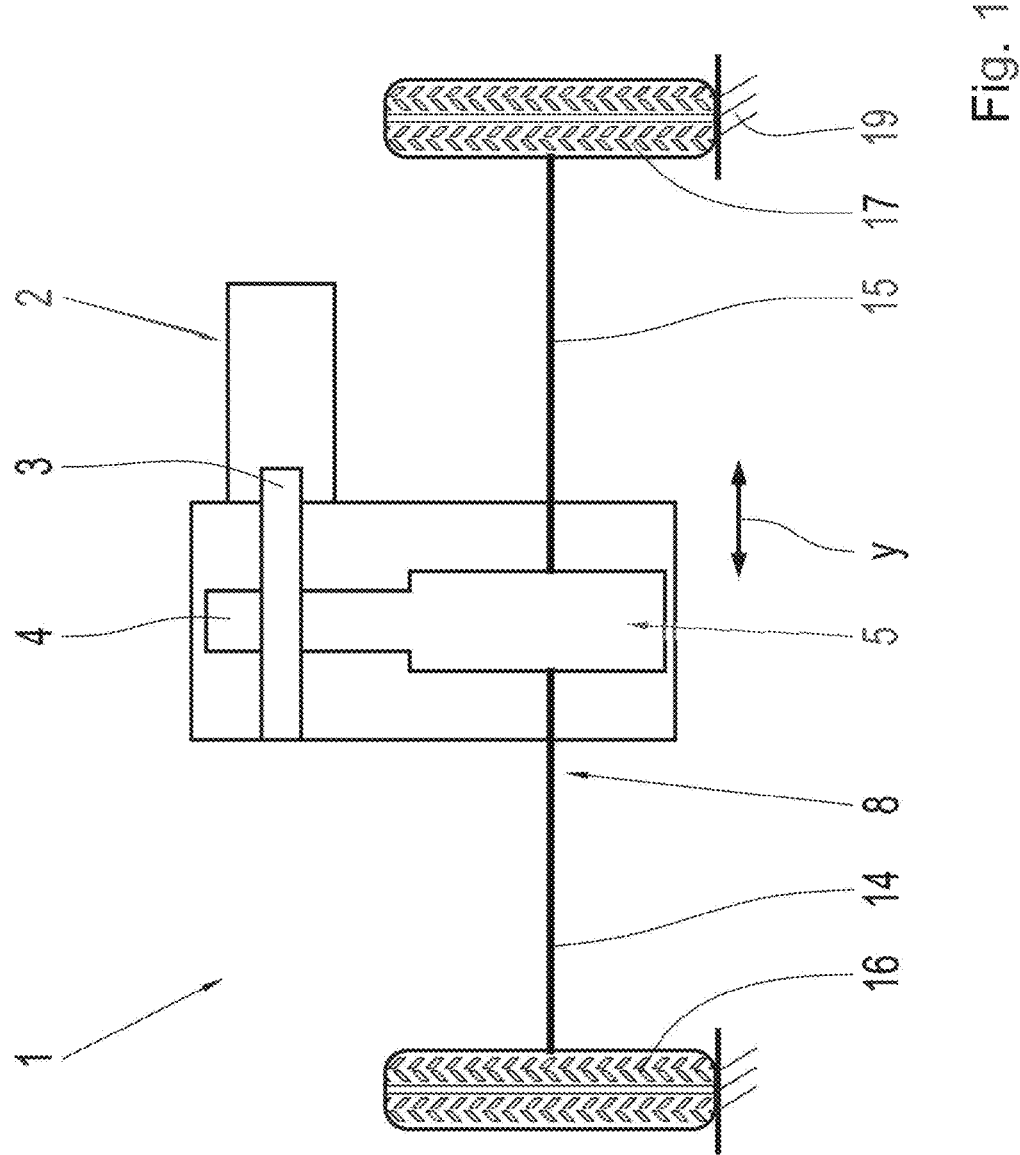

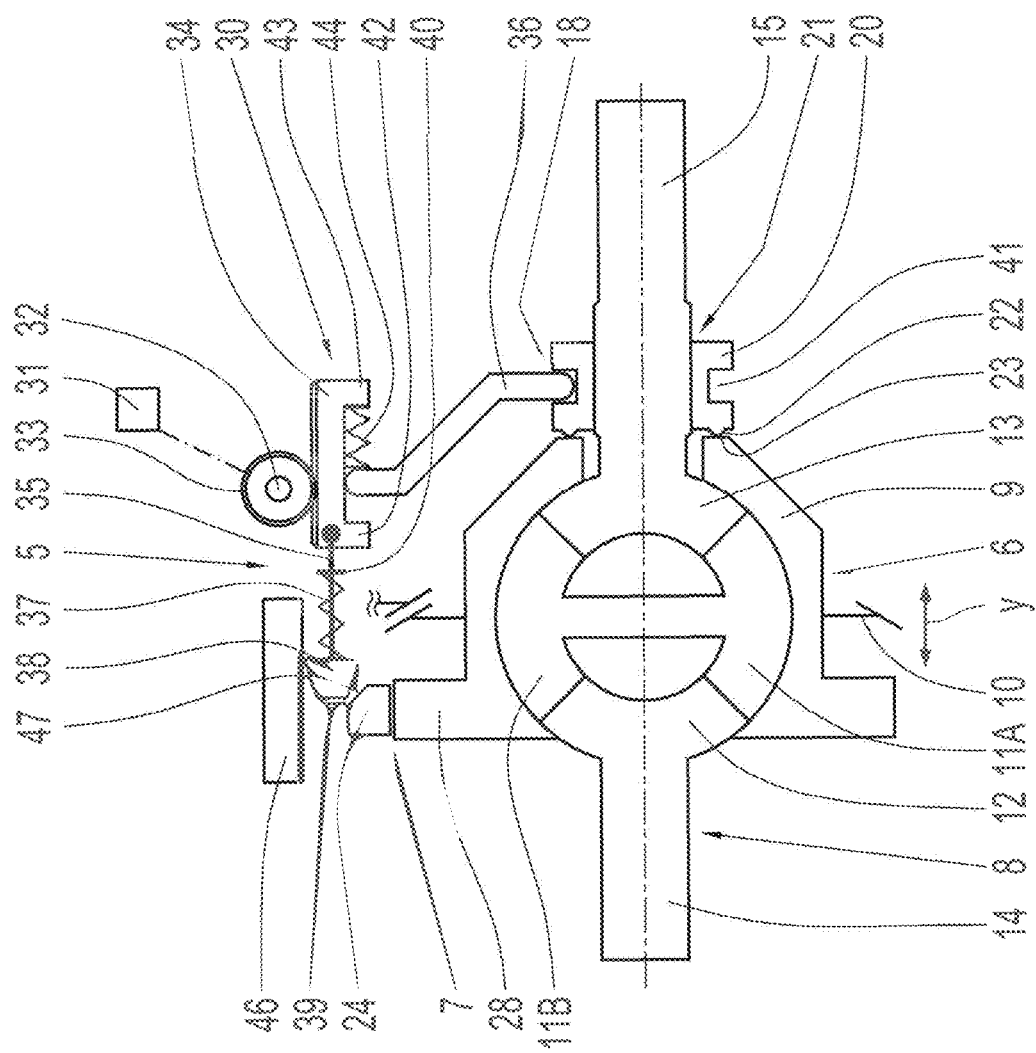
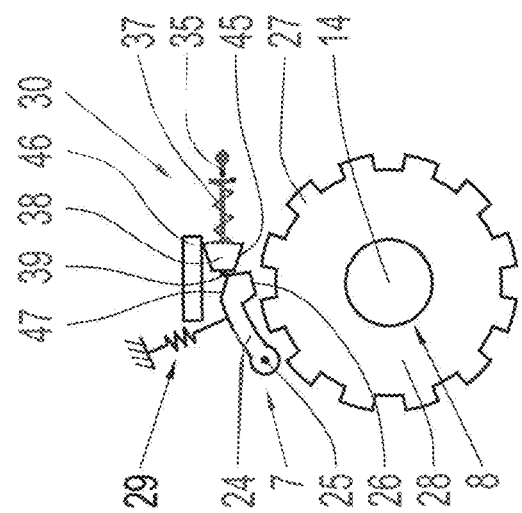
Fig. 3a
Fig. 3b

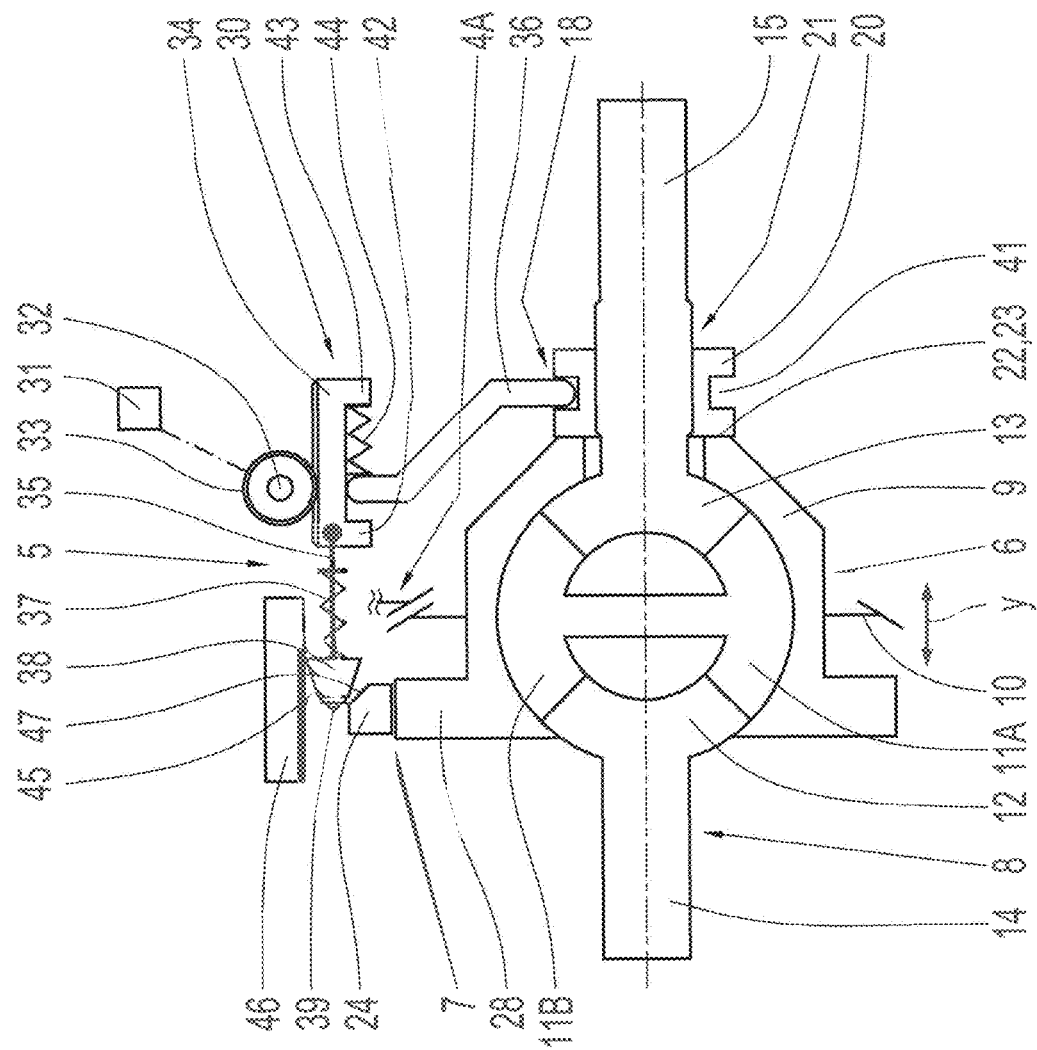
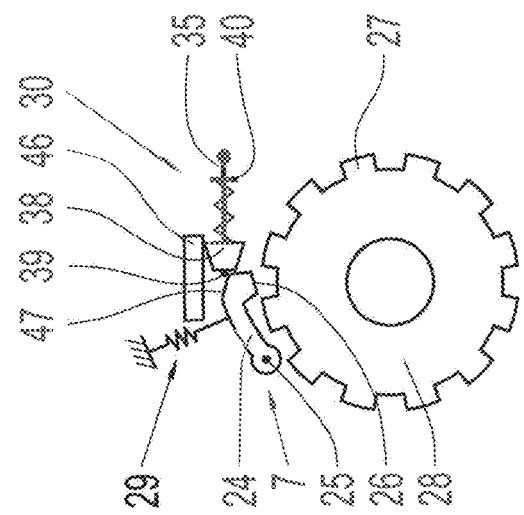
Fig. 4a
Fig. 4b

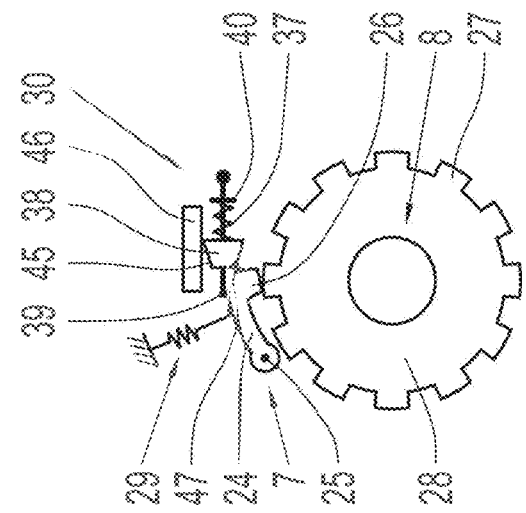

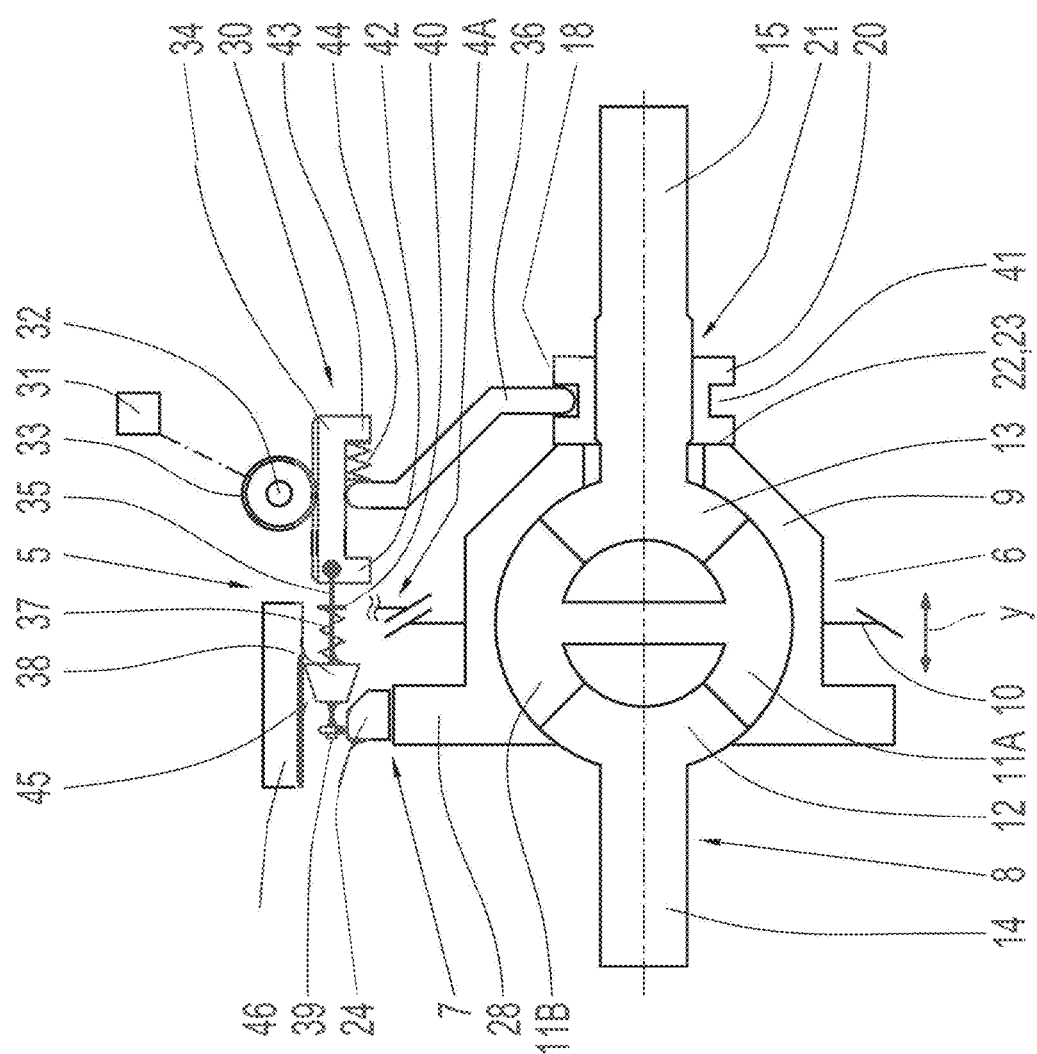
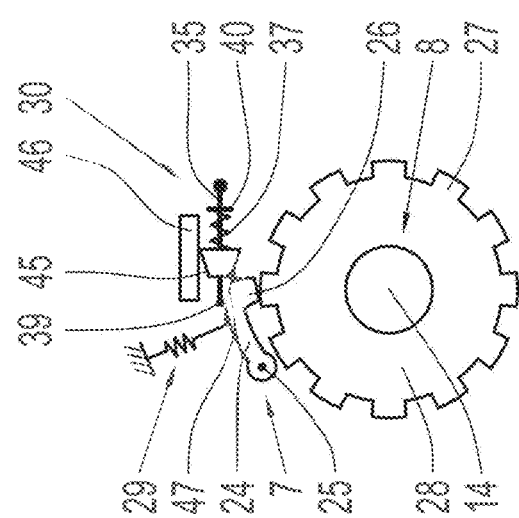
Fig. 6a
Fig. 6b

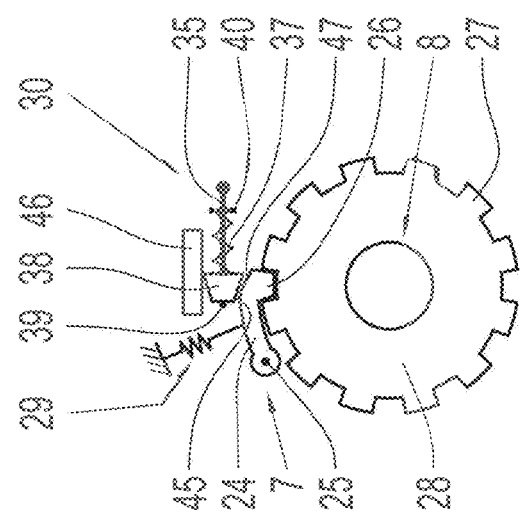
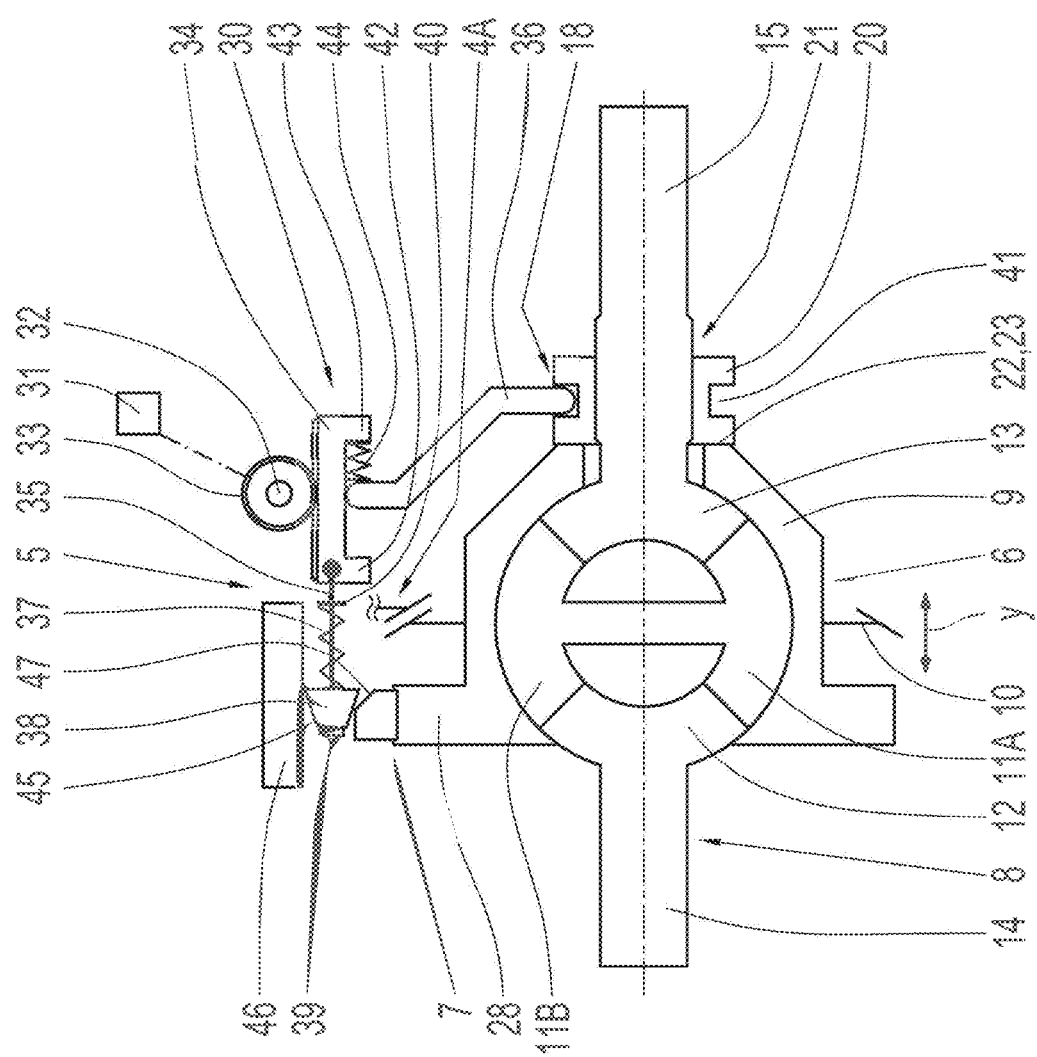
Fig. 7a
Fig. 7b

DEVICE FOR A VEHICLE DRIVELINE WITH AN AXLE DIFFERENTIAL

RELATED APPLICATIONS

This application claims the benefit of and right of priority under 35 U.S.C. § 119 to German Patent Application no. 10 2024 201 618.7, filed on 22 Feb. 2024, the contents of which are incorporated herein by reference in its entirety.

FIELD OF THE DISCLOSURE

The invention relates to a device for a vehicle drivetrain with an axle differential, of the type defined in greater detail herein.

BACKGROUND

A securing device for securing an electric vehicle at rest is known from DE 10 2020 113 497 A1. The securing device comprises a transmission blocking device and a differential blocking device. The transmission blocking device comprises a transmission blocking drive and a transmission blocking shaft for driving a transmission blocking means between a blocking position and a transmission release position. The differential blocking device is made with a differential blocking drive and with a differential lock in order to drive a differential blocking means between a differential blocking position and a differential release position. The transmission blocking shaft and the differential blocking shaft are connected with one another in a drive-transmitting manner. In this case, the drive-transmitting connection relates in particular to a drive movement from the respective release position to the respective blocking position of the transmission blocking device and the differential blocking device.

SUMMARY

By coupling the transmission blocking drive with the differential blocking drive, a redundant operation should be achieved. By virtue of the redundant design of the securing device with two drive units the securing device takes up a lot of fitting space in a vehicle and also entails high production costs.

The purpose of the present invention is to provide a device for a vehicle drivetrain which saves fitting space and is inexpensive, and with which an equalization function of an axle differential can be released and blocked, and with which a parking lock can be engaged and disengaged.

According to the invention, this objective is achieved with a device for a vehicle drivetrain as variously disclosed herein.

The device according to the invention is provided for use in a vehicle drivetrain and is made with an axle differential. Furthermore, the device comprises a differential blocking device for blocking and releasing the equalization function of the axle differential, by means of which rotation speed differences between wheels of a vehicle axle can be compensated. In addition, the device is made with a parking lock for blocking and releasing a rotation movement of a drive output of a vehicle drivetrain and with an actuating mechanism that can be driven by a drive unit. By way of the actuating mechanism, the differential blocking device and the parking lock can be actuated by the drive unit.

In this case, the differential blocking device and the parking lock can be actuated or driven via the actuating mechanism by a single, or exactly one drive unit, in a space-saving and inexpensive manner. For example, the drive unit can be in the form of an electric motor which can preferably be operated in both rotation directions.

According to the invention, the actuation of the parking lock and the actuation of the differential blocking device by the drive unit and the actuating mechanism are coordinated with one another, starting from an operating condition of the differential blocking device in which the differential blocking device releases the equalization function, and the parking lock is in a disengaged condition. According to the invention, the coordination mode is chosen such that at the end of a first phase of actuating the parking lock and actuating the differential blocking device only the equalization function of the axle differential can be blocked, and the parking lock is in its disengaged state.

Furthermore, the coordination is such that at the end of a second phase of actuating the parking lock and the differential blocking device, which second phase follows on after the first phase, the equalization function of the axle differential can be blocked, and the parking lock can be engaged.

Thus, by means of the device according to the invention, various operating conditions of a vehicle drivetrain can be obtained. For example, during a driving operation of a vehicle drivetrain incorporating the device, it is possible both for the equalization function of the axle differential to be released and a rotation speed equalization in the area of the axle differential between two wheels of a vehicle axle to take place, while at the same time the parking lock is disengaged.

Furthermore, during a driving operation the parking lock should be kept in its disengaged condition and only the equalization function of the axle differential should be blocked in order to ensure the propulsion of a vehicle even when one of the drive wheels of a vehicle axle is not in contact with the ground.

In addition, the parking lock can be changed to its engaged condition in order to secure a parking vehicle against rolling away, this being at first possible regardless of whether the differential blocking device releases or blocks the equalization function of the axle differential.

In the parked operation condition of a vehicle drivetrain made with the device, if it is the case that one of the drive wheels is not in contact with the ground, the device according to the invention is designed, in addition to the engaged parking lock, to also block the equalization function of the axle differential directly by means of the differential blocking device in order to secure a parked vehicle against undesired rolling away.

Moreover, starting from an engaged condition of the parking lock the device is designed to disengage it and to change the differential blocking device from an operating condition in which the equalization function is blocked toward a condition in which the equalization function is released.

In a simply designed embodiment of the device according to the invention that can be assembled with little effort, the locking mechanism can comprise an actuating element which is connected with the drive unit. This provides the possibility, by means of the actuating element, of transmitting part of the drive power from the drive unit to the parking lock coupling element of the actuating mechanism and part to a differential coupling element of the actuating mechanism. In such an embodiment, the actuating element corresponds to a distributor element by means of which the drive power from the drive unit is used in part to actuate the parking lock and in part to actuate the differential blocking device.

In a further simply designed embodiment of the device according to the invention, the differential coupling element can engage in a groove of a shifting sleeve. The shifting sleeve can be arranged on a lateral shaft of the axle differential that leads to a drive wheel of the vehicle drivetrain, so as to move longitudinally between a blocking position and a release position and is connected rotationally fixed to the output shaft. In this case it can be provided that to block the equalization function of the axle differential, the shifting sleeve can be changed from the differential coupling element in its blocking position, in which the shifting sleeve engages with interlock with a differential cage of the axle differential, to its release position in which the interlock between the shifting sleeve and the differential cage is separated.

The differential coupling element can be made adjustable relative to the actuator element. In the release position of the shifting sleeve the differential coupling element can come up against a stop area of the actuator element and so keep the shifting sleeve out of engagement with the differential cage. Here, it is possible for an actuation path of the differential coupling element to be restricted by the stop area in a first adjustment direction relative to the actuator element.

Furthermore, it is possible for the actuator element to be made with a second stop area by which an actuation path of the differential coupling element relative to the actuator element can be restricted in a second adjustment direction opposite to the first adjustment direction. Between the second stop area and the differential coupling element a spring element can be arranged, which acts upon the differential coupling element with a spring force in the direction toward the first stop area.

To avoid unacceptably high loading of the device according to the invention, during the actuation of the differential locking device, the differential coupling element in the blocking position of the shifting sleeve, and during a tooth-on-tooth position between the shifting sleeve and the differential cage relative to the actuation element, can be arranged each time in positions between the two stop areas without being in contact either with the first or the second stop area.

In that way, in a simple manner it is ensured that the differential coupling element is only acted upon by the spring force of the spring unit in the direction toward its blocking position, so that the adjusting force applied to the differential coupling element and also to the shifting sleeve is of an acceptable size depending on the spring constant of the spring unit.

Furthermore, it can be provided that the parking lock coupling element is connected fast to the actuating element. Moreover, a parking lock cone that can be moved longitudinally can be arranged on the parking lock coupling element. The parking lock cone can be acted upon by the spring force of a further spring element which adjusts the parking lock cone on the parking lock coupling element in the direction toward a blocking position in which the parking lock is kept in the engaged condition by the parking lock cone and the parking lock cone rests in contact with a stop on the parking lock coupling element. Then, in a simple manner, operating conditions of the device in the area of the parking lock can be obtained during which a so-termed tooth-on-tooth position occurs during the engagement process of the parking lock without unacceptably high loading forces.

The parking lock can comprise a parking lock gearwheel and a parking lock pawl. In that case the parking lock gearwheel can be connected rotationally fixed to the differential cage and the parking lock pawl, which is fixed on the housing side, keeps the parking lock gearwheel rotationally fixed in its engaged condition. Then, in a simply designed manner the drive output of a vehicle drivetrain can be kept rotationally fixed and when parked a vehicle can be secured against rolling away.

When in the disengaged condition of the parking lock, the parking lock pawl is held by a spring mechanism out of engagement with the parking lock gearwheel, the parking lock can be operated with little effort.

In the engaged condition of the parking lock, the parking lock pawl can be kept in interlocked engagement with the parking lock gearwheel against the spring force of the spring mechanism.

The actuation path of the differential blocking element between its release position and the locking position can be adapted to the actuation path of the parking lock coupling element between its release position and its blocking position in such manner that the equalization function of the axle differential can already be blocked before the parking lock cone actuates the parking lock pawl in the direction of the position in which the parking lock pawl is in the engaged condition of the parking lock. In the release position of the differential blocking element the shifting sleeve is out of engagement with the differential cage and the equalization function of the axle differential is enabled. In contrast, the equalization function of the axle differential is blocked by the shifting sleeve in the blocking position of the differential blocking element. In addition, in the release position of the parking lock coupling element the parking lock is disengaged and can be engaged in the blocking position of the parking lock coupling element.

In such an embodiment, of the device according to the invention, in a simply designed manner the equalization function of the axle differential can be blocked at the same time as the parking brake is disengaged, so that during a driving operation of a vehicle drivetrain made with the device the equalization function of the axle differential can be blocked and such a vehicle can be propelled. This is advantageous when one of the two drive wheels connected to the axle differential is in contact with a slippery, for example icy surface or is out of contact with the ground.

The actuation path of the differential blocking element, between its release and blocking positions, can be adapted to the actuation path of the parking lock coupling element between its release and blocking positions, in such manner that the equalization function of the axle differential is blocked and the parking lock cone actuates the parking lock pawl in the direction of the position in which the parking lock pawl engages the parking lock. In that way, the drive output of a vehicle drivetrain can be rotationally fixed by the parking lock and the vehicle can be secured against rolling away. Since, in addition, the equalization function of the axle differential can be blocked when the parking lock is engaged, a vehicle can be secured against rolling away even when the condition of the ground is poor.

In a simply designed and both space-saving and cost-saving embodiment, the device according to the invention is made in the form of a rack bar which, in the area of a tooth profile, engages with a gearwheel which is connected to a drive input shaft of the drive unit. By virtue of such an arrangement, in a simply designed manner the rotary drive of the drive unit can be converted to a translational movement of the actuating element of the actuating mechanism.

Furthermore, it can be provided that the actuating element of the drive unit can be moved from a first position, in which the equalization function of the axle differential is enabled and the parking brake is disengaged, to a second position in which the equalization function of the axle differential can be blocked but the parking lock is disengaged as before. Moreover, the actuating element can be moved from the second position to a third position in which the equalization function of the axle differential can be blocked, and the parking lock can be engaged.

In the second and third positions of the actuating element, and if a tooth-on-tooth position has occurred between the shifting sleeve and the differential cage, the differential coupling element can be moved against the spring force of the spring unit and relative to the actuating element in the direction toward the second stop area.

In the second position of the actuating element, the parking lock cone can be positioned a distance away from the parking lock pawl. Furthermore, it is possible for the parking lock cone, when the actuating element is in its third position, to be in contact with the parking lock pawl and in the event of a tooth-on-tooth position between the parking lock pawl and the parking lock gearwheel, to move against the spring force of the further spring unit and, relative to the parking lock coupling element, away from the latter.

The invention is not limited to the combination of features in the independent claim or in the claims that depend on it. There are also options for combining individual features with one another insofar as they emerge from the claims, the description of embodiments given below, or directly from the drawings. References of the claims to the drawings by the use of indexes are not intended to restrict the protective scope of the claims.

BRIEF DESCRIPTION OF THE DRAWINGS

Preferred further developments of the invention emerge from the subordinate claims and the following description. Example embodiments of the invention, to which it is not limited, are explained in greater detail with reference to the drawings, which show:

FIG. 1: A simplified representation of a vehicle drivetrain;

FIG. 3a: A representation corresponding to FIG. 2a, of the device during a driving operation of the vehicle drivetrain and in an operating condition in which the parking lock is disengaged and there is a tooth-on-tooth position of the differential blocking device;

FIG. 3b: A representation corresponding to FIG. 2b, of the parking lock in an operating condition which correlates with the operating condition of the device shown in FIG. 3a;

FIG. 4a: A representation corresponding to FIG. 2a, of the device in an operating condition in which the equalization function of the axle differential is blocked and the parking lock is disengaged;

FIG. 4b: A representation corresponding to FIG. 2b, of the parking lock in an operating condition that correlates with the operating condition of the device shown in FIG. 4a;

FIG. 5a: A representation corresponding to FIG. 2a, of the device in an operating condition in which there is a tooth-on-tooth position both in the area of the differential blocking device and also in the area of the parking lock;

FIG. 5b: A representation corresponding to FIG. 2b, of the parking lock in an operating condition which correlates with the operating condition of the device shown in FIG. 5a;

FIG. 6a: A representation corresponding to FIG. 2a, of the device in an operating condition in which the equalization function of the axle differential is blocked and there is a tooth-on-tooth position in the parking lock;

FIG. 6b: A representation corresponding to FIG. 2b, of the parking lock in an operating condition which correlates with the operating condition of the device shown in FIG. 6a;

FIG. 7a: A representation corresponding to FIG. 2a, of the device in an operating condition in which the equalization function of the axle differential is blocked and the parking lock is in its engaged condition;

FIG. 7b: A representation corresponding to FIG. 2b, of the parking lock in an operating condition which correlates with the operating condition of the device shown in FIG. 7a;

FIG. 8b: A representation corresponding to FIG. 2b, of the parking lock in an operating condition which correlates with the operating condition of the device shown in FIG. 8a.

DETAILED DESCRIPTION

Figure 2A:
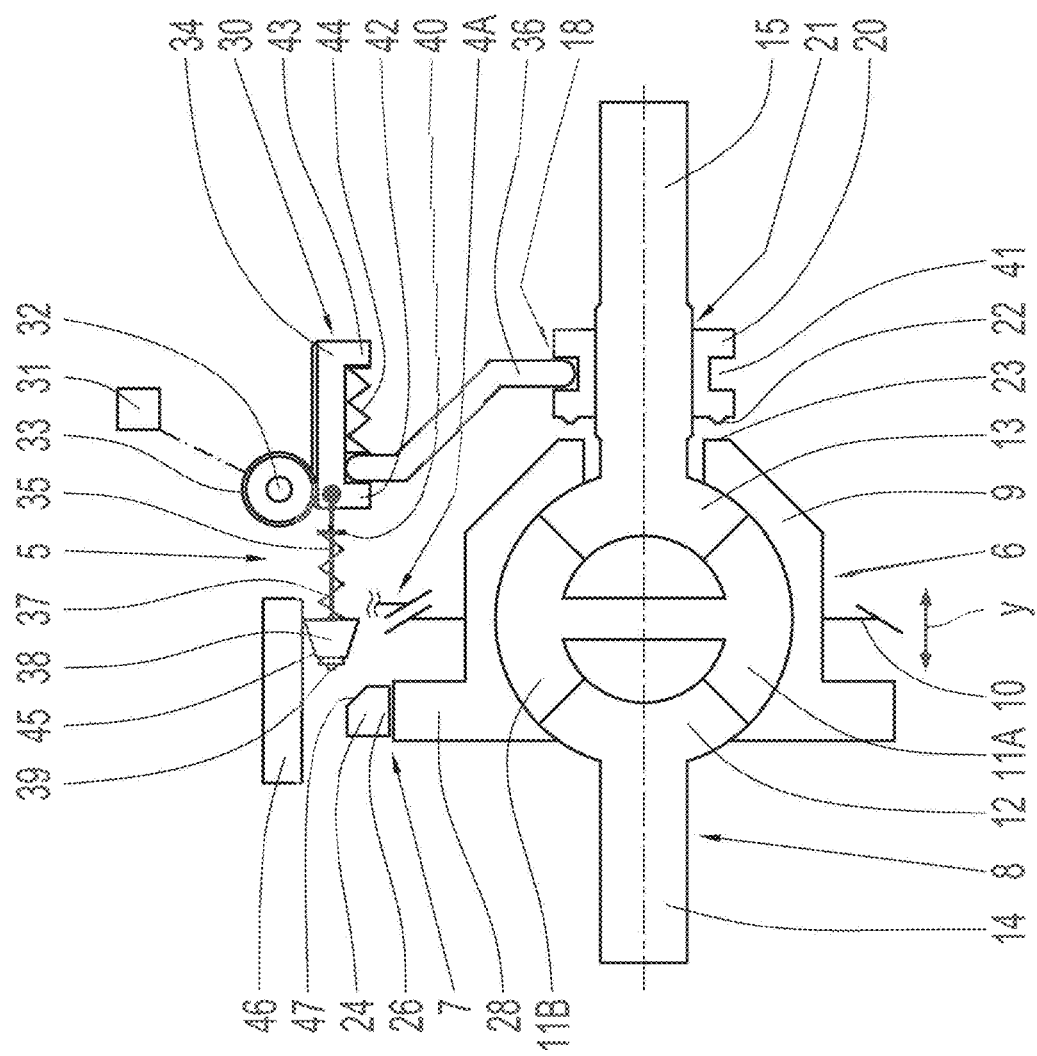
FIG. 2a: A schematic view of a device of the vehicle drivetrain according to FIG. 1, with an axle differential having a differential blocking device for blocking and releasing the equalization function of the axle differential and with a parking lock for blocking and releasing the drive output of the vehicle drivetrain.

FIG. 1 shows a greatly simplified view of a vehicle drivetrain 1, which in this case is in the form of a vehicle axle that can be powered electrically by a drive input device 2. In this case the drive device 2 is in the form of an electric machine which can be operated both as a motor and as a generator. Furthermore, the drive input device can also be an internal combustion engine or a combination of at least one electric machine and at least one internal combustion engine.

An output shaft 3 of the drive device 2 is drivingly connected via a housing 4 to a device 5. The device 5 comprises an axle differential 6 represented schematically in FIG. 2a and a parking lock 7 by means of which, in a manner known as such, a drive output 8 of the vehicle drivetrain 1 can be made rotationally fixed in order to be able to keep a vehicle equipped with the vehicle drivetrain 1 securely at rest when it is in a parked operating condition. In this case the axle differential 6 comprises a differential cage 9 which in this case is connected to a transmission output 4A of the transmission 4 by way of a divider gearwheel 10 arranged on the differential cage 9. From the differential housing or the differential cage 9, the drive torque is transmitted to equalization bevel gears 11A, 11B and to bevel gears 12, 13 that mesh with them and which are connected to lateral output shafts 14, 15 of the axle differential 6. The lateral output shafts 14, 15 are in turn in rotationally fixed connection with the drive wheels 16, 17 of the vehicle drive axle 1.

When a vehicle equipped with the vehicle drivetrain 1 starts off straight ahead, the equalization bevel gears 11A, 11B do not rotate. In contrast, when driving round a curve the rotation speed difference between the two drive wheels 16 and 17 is compensated by corresponding rotation movements of the equalization bevel gears 11, 12. The torque on both lateral output shafts 14 and 15 is then always equal.

In order to be able to block the equalization function of the axle differential 6 during certain operating situations of the vehicle drivetrain 1, the device 5 is made with a differential blocking device 18. By means of the differential blocking device 18 the action of the axle differential. i.e. the equalization function, can be suppressed or blocked. This is always necessary when one of the drive wheels 16, 17 loses its adhesion to the ground and spins. For example, if one of the drive wheels 16 or 17 is completely out of contact with the ground, that drive wheel cannot support any driving force in the area of the ground 19. Consequently, at the drive wheel 17 or 16 with good ground adhesion the torque will also be zero and the vehicle cannot be propelled.

By virtue of the differential blocking device 18 the equalizing action of the axle differential 6 is suppressed and the two lateral output shafts 14, 15 are connected rotationally fixed to one another. This makes it possible, at the drive wheel 16 or 17 with good ground adhesion, for the drive torque from the drive device 2 to be supported so that the vehicle built with the vehicle drivetrain 1 can be propelled.

In this present case, the differential blocking device 18 comprises a shifting sleeve 20 which is arranged in the transverse direction Y of the vehicle on the lateral output shaft 15 in a longitudinally displaceable manner and is connected rotationally fixed to the lateral output shaft 15 in the area of a tooth array 21 preferably in the form of splined teeth. Depending on an axial position of the shifting sleeve 20 the shifting sleeve can be brought into interlocking engagement by way of its crown gear teeth 22 with crown gear teeth 23 of the differential cage 9. The lateral output shaft 15 is then connect rotationally fixed to the differential cage 9 and the equalization function of the axle differential 6 is blocked.

By virtue of the design of the device 5, which will be described in greater detail below, it is possible to block the equalization function of the axle differential 6 during a driving operation of the vehicle drivetrain 1 and at the same time to maintain the parking lock 7 in its disengaged condition. In addition, it is possible to block the equalization function of the axle differential 6 even when the parking lock is engaged, in order even then to block the drive output 8 against rotation to the required extent when only one of the drive wheels 16, 17 is making frictional contact with the ground 19. This is the case since when the equalization function of the axle differential 6 is released, the parking lock in its engaged condition can only keep the drive output 8 rotationally fixed in the desired manner if both of the drive wheels are in frictional contact with the ground 19. If one of the drive wheels 16, 17 loses contact with the ground 19, then by virtue of the equalization function of the axle differential 6 a vehicle made with the vehicle drivetrain 1 can spin and roll away, which is of course undesired.

Figure 2B:
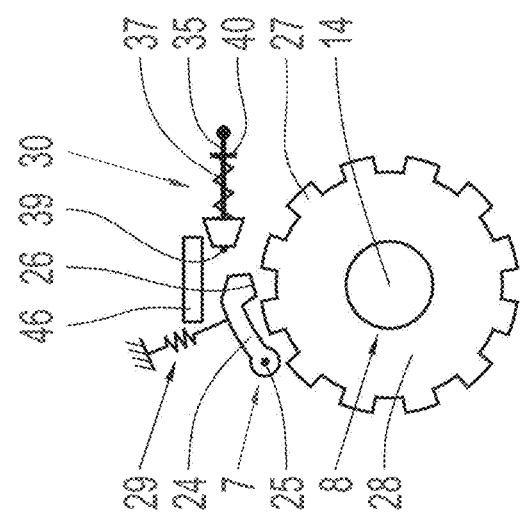
FIG. 2b: A simplified stand-alone representation of the parking lock of the device according to FIG. 2a, shown in the disengaged condition.

FIG. 2a shows an operating condition of the device 1 in which neither is the equalization function of the axle differential 6 blocked by the differential blocking device 18, nor is the parking lock 7 engaged. The parking lock 7 comprises a parking lock pawl 24 shown in FIG. 2b from the side and in a swiveled position that corresponds to a disengaged state of the parking lock 7. The parking lock pawl 24 can rotate about a rotation axis 25 fixed in relation to the housing and can be brought into engagement with a tooth profile 26 that engages in an external tooth profile 27 of a parking lock gearwheel 28. In this case the parking lock gearwheel 28 is connected rotationally fixed to the differential cage 9. In that way the differential cage 9 can be kept rotationally fixed by the parking lock gearwheel 28 when the parking lock pawl 24 engages with its tooth profile 26 in the external teeth 27 of the parking lock gearwheel 28. Moreover, the parking lock pawl 24 can be kept out of engagement with parking lock gearwheel 28 by a spring device 29.

Both the parking lock 7 and the differential locking device 18 can be actuated by an actuation mechanism 30 of the device 5 in the manner described in greater detail below, in order to be able to block and release the equalization function of the axle differential 6 and to engage and disengage the parking lock 7.

In the example embodiment of the device 1 considered in this case, the actuation mechanism 30 is connected to a rotational drive unit 31. A driveshaft 32 can be driven in both rotation directions by the drive unit 31. On the driveshaft 32 there is arranged a gearwheel 33 connected rotationally fixed thereto, which is engaged with an actuating element 34 of the actuation mechanism 30 in this case in the form of a rack bar. A parking lock coupling element 35 and a differential coupling element 36 are functionally connected to the actuating element 34.

On the parking lock coupling element 35 there is arranged a parking lock cone 38 which can be moved along in the longitudinal direction of the parking lock coupling element 35 against the spring force of a spring unit 37. In the operating condition of the device 5 shown in FIG. 2a, the parking lock cone 38 is pressed by the spring unit 37 against a stop 39 of the parking lock coupling element 35. At its end remote from the parking lock cone 38 the spring unit 37 is supported against a further stop 40) of the parking lock coupling element 35. In this case the parking lock coupling element 35 is connected fast to the actuating element 34, so that an actuation movement of the parking lock coupling element 35 causes the parking lock 7 to engage or to be disengaged.

The differential coupling element 36 engages at one end in a groove 41 of the shifting sleeve 20, which extends over the whole of the shifting sleeve 20. This results in a rotational decoupling between the shifting sleeve 20 and the parking lock coupling element 35, which can only be moved by the actuating element 34 in the direction Y transverse to the vehicle but cannot rotate.

The actuating element 34 is made with two stop areas 42, 43 which are a distance apart in the direction Y transverse to the vehicle and which delimit an actuation path of the differential coupling element 36 relative to the actuating element 34. Between the differential coupling element 36 and the stop area 43 a further spring unit 44 is provided, which is supported against the differential coupling element 36 and the stop area 43 and which, in the operating condition shown in FIG. 2a in which the equalization function of the axle differential 6 is released by the differential blocking device 18, presses the differential coupling element 36 toward the stop area 42.

If there is a need to block the equalization function of the axle differential 6 and/or a need to engage the parking lock 7, the actuating element 34 is moved by the drive unit 31, during a first actuation phase of the differential blocking device 18 and the parking lock 7, from the first place or position shown in FIG. 2a, first of all to a second position shown in FIG. 3a. This actuating movement of the actuating element 34 reduces an axial distance between the parking lock cone 38 and the parking lock pawl 24 so that the parking lock 7 is in the disengaged operating condition shown in FIG. 3b. Since in the area of the differential blocking device 18 there is a tooth-on-tooth position between the crown gear teeth 22 of the shifting sleeve 20 and the crown gear teeth 23 of the differential cage 9, the interlocked connection between the shifting sleeve 20 and the differential cage 9 has not yet formed. Owing to the actuating movement of the actuating element 34 the differential coupling element 36 is changed from its release position shown in FIG. 2a to the intermediate position shown in FIG. 3a, in which the differential coupling element 36 is no longer up against the stop area 42 and the further spring unit 44 is compressed or prestressed.

As soon as a relative movement between the shifting sleeve 20 and the differential cage 9 takes place, which resolves the tooth-on-tooth position in the area of the differential blocking device 18, the shifting sleeve 20 with its crown gear teeth 22 engages with interlock in the crown gear teeth 23 of the differential cage 9. This is the case even without any further actuating movement of the actuating element 34, since the differential coupling element 36 is moved by the prestressed further spring unit 44 in the direction toward the stop area 42 and thus also the shifting sleeve 20 is moved toward the differential cage 9.

In this last-described operating condition of the device 5, which is shown in FIG. 4a, as can be seen more easily in FIG. 4b the parking lock 7 is still in its disengaged operating position. The device 5 of the vehicle drivetrain 1 is in such an operating condition when the equalization function of the axle differential 6 would not be an advantage, for example when driving over slippery ground.

Even when there is only a need to engage the parking lock 7 starting from the operating condition of the device 5 shown in FIG. 2a, the device 5 is changed to the same extent by actuating the actuating element 34 during the first operating phase, first to the operating condition shown in FIG. 3a. As soon as the actuating element 34 has moved the differential coupling element 36 and the parking lock coupling element 35 from the positions shown in FIG. 2a, as described earlier in relation to FIG. 3a, and the shifting sleeve 20 is in the position shown in FIG. 3a or in FIG. 4a, a second actuation phase of the device 5 follows on from the first actuation phase.

During the second actuation phase the actuation element 30, starting from its second position, undergoes a further actuation movement in the direction toward the parking lock 7 and in the direction toward a third position. The actuation movement of the actuating element 34 pushes the parking lock cone 38 with its conical outside face 45 to an area between a housing 46 of the device 5 and a conical section 47 of the parking lock pawl 24. This brings about a swiveling movement of the parking lock pawl 24 about the rotation axis 25 in the engagement direction of the tooth profile 26 with the external teeth 27 of the parking lock gearwheel 28.

At the end of the second actuation phase, the actuating element 4 is in its third position and the possibility exists that both in the area of the differential blocking device 18 and also in the area of the parking lock 7 there may be a tooth-on-tooth position which prevents a blocking of the equalization function of the axle differential 6 and an engagement of the parking lock 7. This operating condition of the device 5 is shown in FIG. 5a and FIG. 5b.

Owing to the tooth-on-tooth position in the area between the tooth profile 26 and the external teeth 27, the parking lock cone 35 is pushed away from the stop 39 of the parking lock coupling element 35 against the spring force of the spring unit 37, and the spring unit 37 is correspondingly compressed. As soon as a rotation movement takes place between the differential cage 9 and the lateral output shaft 15, which resolves the tooth-on-tooth position of the differential blocking device 18, the shifting sleeve 20 engages with interlock in the differential cage 9. However, as shown in FIG. 6a and FIG. 6b the parking lock 7 does not fall completely into place so long as no relative rotation movement takes place between the parking lock gearwheel 28 and the parking lock pawl 24, which movement would resolve the tooth-on-tooth position between those two components.

As soon as the parking lock gearwheel 28 rotates by a sufficient amount, as shown in FIG. 7a and FIG. 7b, the parking lock pawl 24 is pressed, against the spring force of the spring device 29, into the external teeth 27 of the parking lock gearwheel 28 and the parking lock 7 is engaged. This is the case since the parking lock cone 38 is moved by the spring unit 37 in the direction toward the stop 39 and the parking lock pawl 24, now released by the parking lock gearwheel 28, can move radially inward about the rotation axis 25 toward the parking lock gearwheel 28.

Figure 8A:
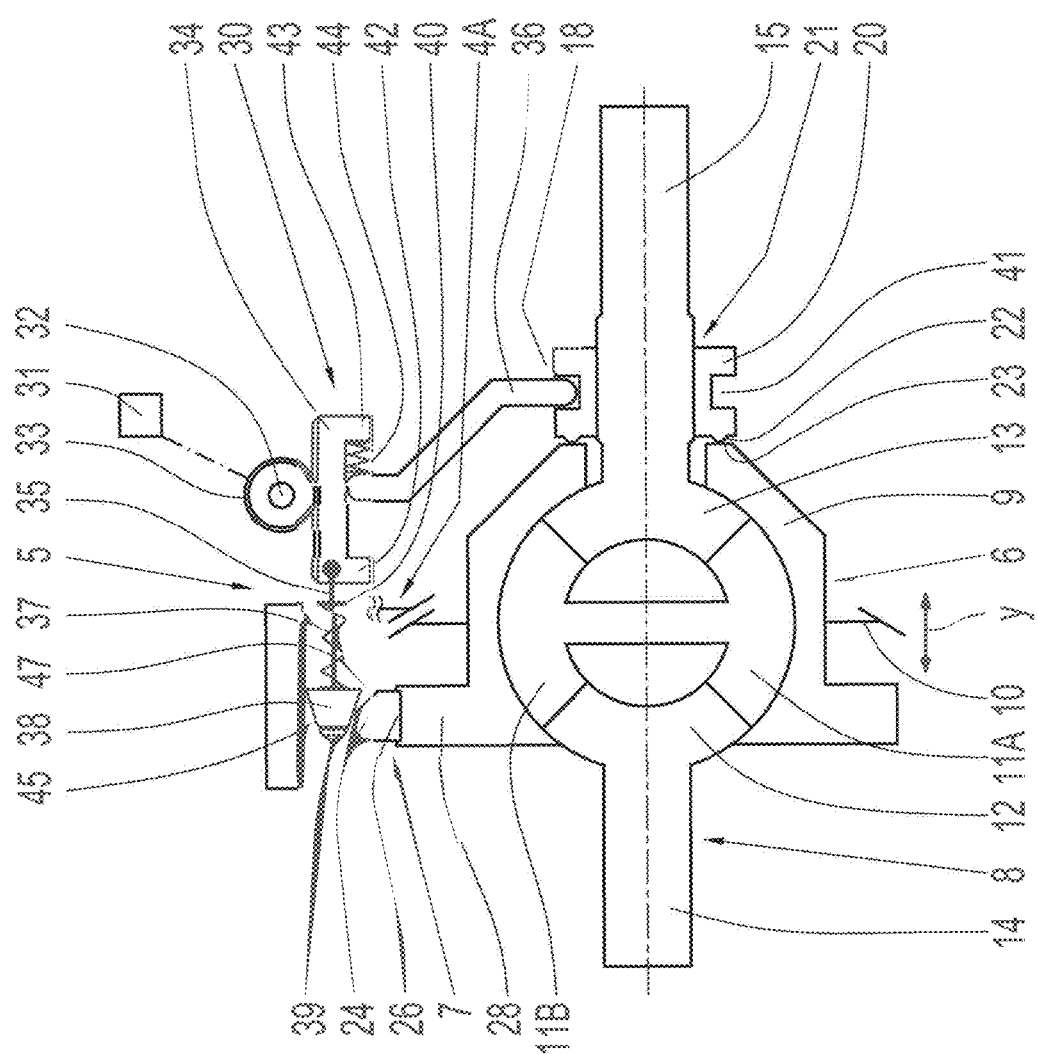
FIG. 8a: A representation corresponding to FIG. 2a, of the device in an operating condition in which the parking lock is engaged and there is a tooth-on-tooth position in the area of the differential blocking device.
Figure 8B:
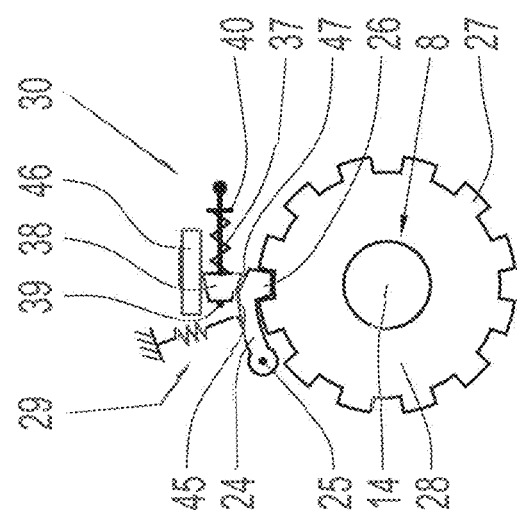

In contrast, the possibility also exists that starting from the operating condition of the device 5 shown in FIGS. 5a and 5b, only the parking lock 7 changes to its engaged operating condition during the second actuation phase when the parking lock gearwheel 28 undergoes a rotation movement relative to the parking lock pawl 24, which movement resolves the tooth-on-tooth position between the parking lock pawl 24 and the parking lock gearwheel 28 and prevents a corresponding rotation movement between the differential cage 9 and the shifting sleeve 20. This operating condition of the device 5 is shown in FIG. 8a and FIG. 8b.

Figure 9:
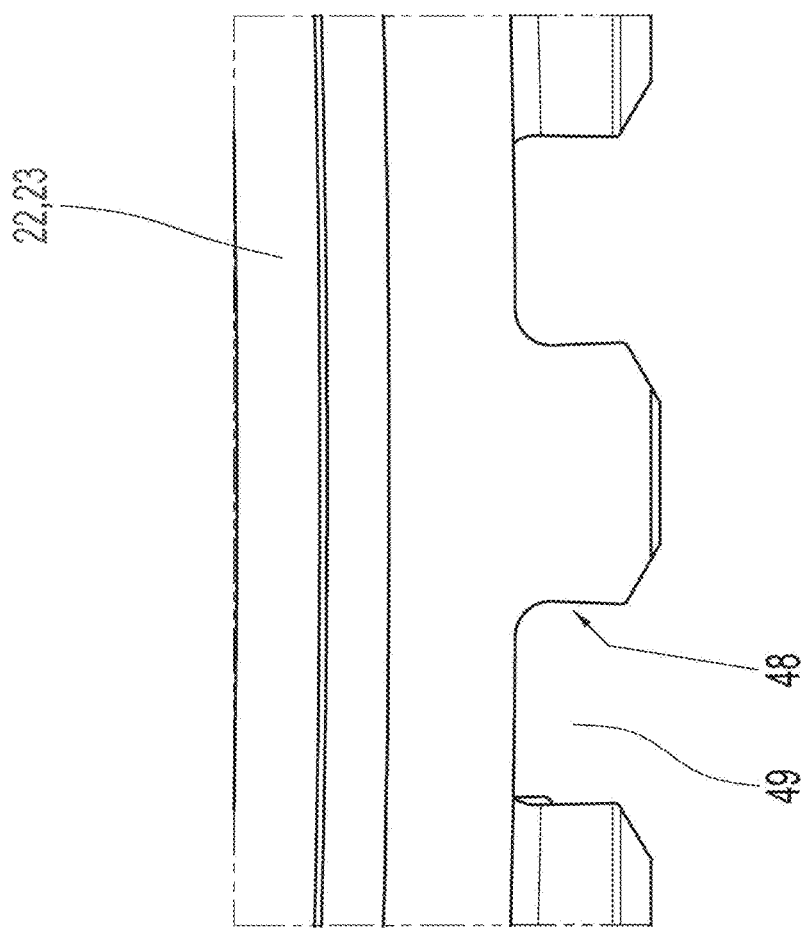
FIG. 9: An enlarged partial representation of a tooth profile of a shifting sleeve of the differential blocking device made in the form of an axial claw.

Particularly during a driving operation of the vehicle drivetrain 1, in order to prevent spontaneous release of the interlocked engagement of the shifting sleeve 20 in the differential cage 9, the tooth profiles of the crown gear teeth 22 of the shifting sleeve 20 and the tooth profile of the crown gear teeth 23 of the differential cage 9 can each be made with an undercut 48 as shown in FIG. 9. The undercuts 48 of the crown gear teeth 22 and the crown gear teeth 23, in each case engage in tooth gaps 49 of the crown gear teeth 23 or 22 respectively, to hook into them. This hooking-in between the crown gear teeth 22 and 23 prevents a torque applied by the differential blocking device 18 from releasing the interlock between the shifting sleeve 20 and the differential cage 9. Such a design of the tooth profiles of the crown gear teeth 22 and 23 has the result that the blocking action of the differential blocking device 18 can only be released when the axle differential 6 is in a load-free condition.

If there is a corresponding need to disengage the parking lock 7, the drive unit 31 drives the actuating element 34 by way of the gearwheel 33 and moves the actuating element away from the position shown in FIG. 7a in the direction toward the position shown in FIG. 2a. The result is that the parking lock cone 38 is increasingly pulled out of engagement with the parking lock pawl 24 and the parking lock pawl 24 moves out of engagement with the parking lock gearwheel 28. This is the case when a torque applied to the parking lock gearwheel 28 and a holding force that results therefrom, which keeps the parking lock pawl 24 engaged in the parking lock gearwheel 28, is smaller than the spring force of the spring device 29. In addition, the movement of the actuating element 34 has the result that the actuating element 34 comes into contact with its stop area 42 on the differential coupling element 36, and the shifting sleeve 20, in the load-free condition of the differential blocking device 18, is pulled out of engagement with the differential cage 9 and is lifted clear from the latter.

Indexes

1 Vehicle drivetrain
2 Drive device

3 Output shaft
4 Transmission
4A Transmission outlet
5 Device
6 Axle differential
7 Parking lock
8 Drive output of the vehicle drivetrain
9 Differential cage
10 Divider gear
11A, 11B Equalization bevel gears
12, 13 Bevel gear
14, 15 Lateral output shafts
16, 17 Drive wheel
18 Differential blocking device
19 Ground surface
20 Shifting sleeve
21 Tooth array
22 Crown gear teeth of the shifting sleeve
23 Crown gear teeth of the differential cage
24 Parking lock pawl
25 Rotation axis
26 Tooth profile of the parking lock pawl
27 External teeth of the parking lock gearwheel
28 Parking lock gearwheel
29 Spring device of the parking lock pawl
30 Actuation mechanism
31 Drive unit
32 Driveshaft of the drive unit
33 Gearwheel of the driveshaft
34 Actuating element
35 Parking lock coupling element
36 Differential coupling element
37 Spring unit of the parking lock coupling element
38 Parking lock cone
39 Stop of the parking lock coupling element
40 Further stop of the parking lock coupling element
41 Groove in the shifting sleeve
42 Stop area of the actuating element
43 Further stop area of the actuating element
44 Further spring unit
45 Conical outside face of the parking lock cone
46 Housing
47 Conical section of the parking lock pawl
48 Undercuts of the crown gear teeth 22 and 23
49 Tooth gaps of the crown gear teeth 22 and 23
Y Transverse direction of the vehicle

The invention claimed is:

1. A device for a vehicle drivetrain, comprising:
an axle differential with a differential blocking device configured for blocking and releasing the equalization function of the axle differential;
a parking lock configured for blocking and releasing the drive output of the vehicle drivetrain;
an actuation mechanism configured to be driven by a drive unit by way of which the differential blocking device and the parking lock can be actuated by the drive unit;
wherein the actuation of the parking lock is correlated with the actuation of the differential blocking device by the drive unit and with the actuation mechanism in such manner that at the end of a first phase of the actuation of the parking lock and the actuation of the differential blocking device, only the equalization function of the axle differential can be blocked and the parking lock is in its disengaged condition, and at the end of a second phase of the actuation of the parking lock and the differential blocking device the equalization function of the axle differential can be blocked and the parking lock can be engaged.

2. The device according to claim 1, wherein the actuation mechanism comprises an actuating element which is connected to the drive unit and by means of which a driving force of the drive unit can be transmitted in one part to a parking lock coupling element of the actuating mechanism and in the other part to a differential coupling element of the actuating mechanism.

3. The device according to claim 2, wherein the differential coupling element is configured to engage in a groove of a shifting sleeve, which is arranged on a lateral output shaft of the axle differential, so that the shifting sleeve can move longitudinally between a blocking position and a release position, wherein the shifting sleeve is connected rotationally fixed to the output shaft, and which, in order to block the equalization function of the axle differential, can be moved by the differential coupling element to the blocking position in which the shifting sleeve is engaged with interlock with a differential cage of the axle differential, and can be changed to the release position in which the interlock between the shifting sleeve and the differential cage is separated.

4. The device according to claim 3, wherein the differential coupling element is configured to move relative to the actuating element, so that in the release position of the shifting sleeve the differential coupling element is in contact with a stop area of the actuating element and the shifting sleeve remains disengaged from the differential cage, and wherein from the stop area an actuation path of the differential coupling element relative to the actuating element is restricted in a first actuation direction.

5. The device according to claim 4, wherein the actuating element has a second stop area by which an actuation path of the differential coupling element relative to the actuating element is restricted in a second actuation direction opposite to the first actuation direction, and wherein the device further comprises a spring unit arranged between the second stop area and the differential coupling element, the spring unit configured to act upon the differential coupling element with a spring force acting in the direction of the first stop area.

6. The device according to claim 5, wherein when the shifting sleeve is in the blocking position and during a tooth-on-tooth position between the shifting sleeve and the differential cage, the differential coupling element is in each case located relative to the actuating element in positions between the two stop areas and is not in contact with either the first stop area or the second stop area.

7. The device according to claim 6, wherein the parking lock coupling element is connected fast to the actuating element and the device comprises:
a parking lock cone on the parking lock coupling element, the parking lock cone arranged and configured to move longitudinally; and
a further spring unit having a spring force arranged to act upon the parking lock cone to move the parking lock cone on the parking lock coupling element in the direction of a blocking position in which the parking lock is kept by the parking lock cone in the engaged condition and the parking lock cone is in contact with a stop of the parking lock coupling element.

8. The device according to claim 3, wherein the parking lock comprises a parking lock gearwheel and a parking lock pawl, wherein the parking lock gearwheel is connected rotationally fixed to the differential cage and the parking lock pawl keeps the parking lock gearwheel rotationally fixed in the engaged condition of the parking lock.

9. The device according to claim 8, wherein in the disengaged condition of the parking lock, the parking lock pawl is kept out of engagement with the parking lock gearwheel by a spring device.

10. The device according to claim 9, wherein in the engaged condition of the parking lock, the parking lock pawl is kept engaged with interlock in the parking lock gearwheel in opposition to the spring force of the spring device.

11. The device according to any of claim 1, wherein the actuation path of the differential coupling element between its release position, in which the shifting sleeve is out of engagement with the differential cage and the equalization function of the axle differential is enabled, and the locking position, in which the equalization function of the axle differential is blocked by the shifting sleeve, is adapted to the actuation path of the parking lock coupling element between its release position in which the parking lock is disengaged and its blocking position in which the parking lock can be engaged, in such manner that the equalization function of the axle differential can already be blocked before the parking lock cone actuates the parking lock pawl toward the position in which the parking lock pawl is located when the parking lock is in the engaged condition.

12. The device according to claim 11, wherein the actuation path of the differential blocking element between its release position and its blocking position is adapted to the actuation path of the parking lock coupling element between its release position and its blocking position in such manner that the equalization function of the axle differential can be blocked, and the parking lock cone actuates the parking lock pawl toward the position in which the parking lock pawl is located when the parking lock is in the engaged condition.

13. The device according to claim 1, wherein the actuating element is in the form of a rack bar which, in the area of a tooth profile, is engaged with a gearwheel which is connected to a driveshaft of the drive unit.

14. The device according to claim 1, wherein the actuating element can be changed by the drive unit from a first position in which the equalization function of the axle differential is enabled and the parking lock is disengaged, to a second position in which the equalization function of the axle differential can be blocked and the parking lock is disengaged as before, and from the second position to a third position in which the equalization function of the axle differential can be blocked and the parking lock can be engaged.

15. The device according to claim 14, wherein in the second position and in the third position of the actuating element and when there is a tooth-on-tooth position between the shifting sleeve and the differential cage, the differential coupling element is displaced in opposition to the spring force of the spring unit and relative to the actuating element in the direction toward the further stop area.

16. The device according to claim 15, wherein:
in the second position of the actuating element the parking lock cone is a distance away from the parking lock pawl and in the third position of the actuating element the parking lock cone is in contact with the parking lock pawl; and
the parking lock coupling element is configured to move away from the stop of the parking lock coupling element against the spring force of the further spring unit and relative to the parking lock coupling element in the event of a tooth-on-tooth position between the parking lock pawl and the parking lock gearwheel.

* * * * *